2,886,457

SEALING COMPOSITION

Henry C. Zweifel, Whittier, Denver H. Hull, Anaheim, and William C. Hart, Long Beach, Calif., assignors to Richfield Oil Corporation, Los Angeles, Calif., a corporation of Delaware No Drawing. Application December 19, 1955
Serial No. 554,101

12 Claims. (Cl. 106—261)

Our invention relates to new compositions and is particularly concerned with new compositions primarily intended to seal clearances between mated surfaces against fluid leakage. Our invention also relates to a method of making our new compositions.

The use of "pipe dopes" and "key pastes" to facilitate sealing of the coarse unfinished threads of line pipe and the gaskets in fittings and unmachined articles, such as cleanout doors on crude oil storage tanks, is an established practice. Problems encountered include maintaining seals through severe temperature and mechanical shocks, and the provision of a seal which does not create a separation problem, such as welding of the surfaces, when it is desired to unmate the parts. The divers applications which employ dopes necessitate adaptability of the dopes to evidence varying physical properties; for example, gasket surfaces advantageously employ dopes having a trowelable putty-like consistency while for the small surfaces of line pipe a consistency similar to paint is desirable.

We have now discovered novel compositions of matter which can be employed effectively to seal mated surfaces against fluid leakage. We have also discovered a method of compounding our novel compositions so that the resulting compositions do not separate and the heavy solid components do not settle upon standing at elevated temperatures. Our novel compositions are especially advantageous because they can be readily thickened to trowelable consistency for application to large surfaces and readily thinned to a consistency most desirable for the sealing of relatively small mated surfaces such as the threads of small diameter line pipe.

The compositions of the present invention contain as the essential constituents a stabilizing emulsion, a filler, a drying oil and a bodying agent. Generally, the components of the compositions are employed in amounts as follows:

| Components: | Weight percent |
|---|---|
| Stabilizing emulsion | About 5 to 30. |
| Filler | About 25 to 80. |
| Drying oil | About 3 to 30. |
| Bodying agent | About 10 to 30. |

Particularly satisfactory compositions contain about 15 to 20 weight percent of stabilizing emulsion, about 15 to 25 weight percent of bodying agent, about 5 to 15 weight percent of the drying oil and the remainder about 35 to 65 weight percent of a filler.

The compositions of our invention are characterized by having a stabilizing emulsion as one of the components. By stabilizing emulsion we intend to indicate emulsions which have water as the dispersed phase and which are capable of imparting permanence of homogeneity to the compositions. The stabilizing emulsion appears to function to prevent separation of solids whether the composition be thinned or thickened. The continuous phase of the stabilizing emulsion is composed of non-drying polyolefinic glycerides. Particularly satisfactory materials which can be employed as the continuous phase are the solvent extracted non-drying fraction of heat bodied vegetable oils such as linseed oil and rapeseed oil, polymerized non-drying polyolefinic glycerides solvent extracted from heat bodied marine oils such as herring oil, and synthetic non-drying polymerized polyolefinic glycerides. A satisfactory component available commercially is known as Brapol and is a propane extract of non-drying polymerized polyolefinic glycerides obtained from bodied herring oil. Very desirable stabilizing properties are evidenced when the glycerides employed are characterized as follows:

| | |
|---|---|
| Viscosity at 210° F., SUS | About 900 to 1100. |
| Saponification No. | About 190 to 210. |
| Neutralization No. | About 1.0 max. |
| Iodine value (Wijs) | About 85 max. |

In general the emulsion contains about 4 to 20 parts, on a weight basis, of the continuous phase for each part of the dispersed phase. The preferred stabilizing emulsion contains about 15 parts of non-drying polymerized polyolefinic glycerides propane extracted from bodied herring oil and about 2 parts of water.

As pointed out above fillers comprise about 25 to 80 weight percent of the compositions. The filler component preferably is in itself a mixture of known filler materials presently used in the art relating to pipe dopes and key pastes. Typical fillers include white lead, red lead, lead acetate, powdered lead, amorphous and flake graphite, mica, asbestos, powdered zinc, alumina, talc, clays such as the commercially available bentonite and Filtrol X202, Aquagel and Attapulgus and similar organic and inorganic materials. The filler material employed for any given application advantageously is chosen upon consideration of the conditions obtaining during use. For example where severely alkaline or acid conditions obtain, lead is a most desirable filler. However, to reduce cost a portion of the lead can be replaced by clays which are also inert to acid or alkali or only slightly affected. Graphite is particularly desirable for high temperature applications as well as for those requiring resistance to acids and alkalies. Graphite can stain hands of workmen, a fact which may militate against its use in certain instances. In general, we prefer to employ the fillers in size range of the order of about 100 to 400 mesh though other sizes can be employed as the nature of the surface treated indicates.

The drying oil employed in our compositions is believed to contribute to the described properties of the resulting compositions by tending to hold solids in suspension in addition to contributing to the formation of a tough, flexible rubber like product. Typical drying oils include linseed oil, soya bean oil, tung oil and cottonseed oil. Other known drying oils can be employed if desired; we prefer to employ linseed and cottonseed oils.

The bodying agent or bodying oil employed in our compositions also can be bodying material already known in the art. Functionally the bodying material appears to contribute to the fluidity of the base composition thereby making it applicable to uneven surfaces, for example, and it also assists in maintaining the solids in suspension even when the composition is diluted. The bodying agent also is needed to give the composition a final film and it cannot be replaced by petroleum fractions. Substantially any bodying agent can be employed; however, it should not react with solids present, it should not destroy such bodying effect as is exerted by the drying oil and it should to advantage have a viscosity within the range of the other components of the composition as a mixture. Typical bodying agents which are satisfactory are any of the known fluid vegetable or animal oils, especially those which are substitutes for soya bean oil or cottonseed oil, solutions of thermoplastic or thermosetting resins, for example, high molecular weight isobutylene polymers (Vistanex or its oil solution), acrylic polymers, blown oils, and bodied oils such as bodied linseed oil, bodied rapeseed oil, bodied cottonseed oil and bodied soya bean oil. We prefer to employ bodied soya bean oil.

In preparing our compositions, the filler solids must first be thoroughly wet with the prepared stabilizing emulsion before the other components are incorporated. It has been determined by experimentation that a composition in which the stabilizing emulsion has been added after the solids have been wetted by liquids other than the emulsion will not form a trowelable putty-like consistency by the admixture of additional water, but will result in the separation of the components. It has also been determined by experimentation that the stabilizing emulsion must be employed as a prepared component rather than simply mixing the water and defined glycerides, with the filler and other components, for otherwise the composition will separate upon standing. Accordingly, in preparing our compositions we first prepare the stabilizing emulsion by dispersing water in the glycerides by homogenization or any other method employed in the art of preparing emulsions. The solids are then wetted by the emulsion by mixing the emulsion and filler, for example in a ball or pug mill or equivalent apparatus, after which the drying oil and bodying agent are incorporated with sufficient mixing to obtain a substantially homogeneous product. Atmospheric pressure and ambient temperatures are generally satisfactory conditions for compounding our compositions.

The invention will be described further in conjunction with the following specific examples:

*Example I*

A composition consisting of 20 parts of graphite, 20 parts of bentonitic clay, 10 parts of powdered lead, 23 parts of bodied soya bean oil, 10 parts of raw linseed oil and 17 parts of an emulsion, which was composed of 15 parts of non-drying polymerized polyolefinic glycerides propane extracted from bodied herring oil and 2 parts water, all parts by weight, was used in this example. The graphite, lead and clay were placed in a ball mill and mixed. The prepared emulsion then was added and the resulting mass was mixed for about 15 minutes to insure wetting of all the filler solids. The bodied soya bean oil and linseed oil were then incorporated and stirring was continued for an additional 15 minutes.

About 8 pounds of petroleum spirits were added to 100 pounds of a composition made in accordance with Example I while stirring the mixture. The resulting composition was applied to the threads of line pipe which were used to carry crude oil and gas in oil field operations. During the course of the 20-day test no leaks occurred, and at the end of the test it was determined that the seal had been effected without welding the thread surfaces.

*Example II*

About 30 pounds of water were stirred into a 100-pound sample of the composition made in accordance with the procedure of Example I. The resulting putty-like composition was applied to the mating surfaces of a clean-out door on a crude oil storage tank. Pressure from the oil head above the door surface averaged about 50 pounds per square inch. Over a thirty-day observation period, no leaks developed.

*Example III*

To demonstrate the effectiveness of our compositions under extremes of temperature, a composition such as was made in Example I was placed on pipe threads, which had a history of frequently developing leaks, in an oil refinery. The subject pipe lines included were used to carry both hot and cold oil. Several leaking steam fittings were also subjected to the same test. In every instance, the leaking joints were successfully repaired by application of our compositions.

A particular advantage of the present invention resides in the ability to modify the base material by suitable addition to obtain a pliable or trowelable putty, or a very fluid material of the consistency of paint. Thus by taking a base composition of the invention, for example a composition according to Example I, and adding water a gradual hardening of the composition results. In a particular experiment we have added 30 weight percent of water to a composition made according to the procedure of Example I above and decreased the penetration at 77° F. from about 225 to 175. We then added small amounts of petroleum spirits (a light petroleum distillate having a boiling range of from about 300 to 400° F.) to the water hardened composition and got an abrupt decrease in hardness; thus about 8% of mineral spirits increased the penetration from about 175 to 215. In a similar experiment with a sample of the composition such as was made in Example I, 10 weight percent of mineral spirits changed the composition from one having a penetration of about 225 at 77° F. to one which is entirely fluid at room temperature (defined arbitrarily as penetration in excess of about 400). Incremental addition of water to this oil softened composition rapidly increased the hardness so that upon the addition of about 22 weight percent water a penetration of about 190 at 77° F. resulted. The adaptability of the compositions of the present invention is thus apparent.

We claim:

1. A composition consisting essentially of a homogeneous stable mixture of about 25 to 80 weight percent of a mixture of inorganic fillers, about 3 to 30 weight percent of a raw drying oil, about 10 to 30 weight percent of bodying oil non-reactive with said inorganic fillers and about 5 to 30 weight percent of a stabilizing emulsion, said stabilizing emulsion consisting essentially of water dispersed in a non-drying polymerized polyolefinic glyceride solvent extracted from bodied marine oil, about one part of water being present for each 4 to 20 parts of glyceride.

2. A composition consisting essentially of about 20 parts by weight of graphite, 20 parts by weight of bentonitic clay, 10 parts by weight of powdered lead, 23 parts by weight of bodied soya bean oil, 10 parts by weight of raw linseed oil and 17 parts by weight of a stabilizing emulsion, said stabilizing emulsion consisting essentially of 15 parts of non-drying polymerized polyolefinic glyceride solvent extracted from bodied herring oil and 2 parts of water.

3. A method of preparing the stable composition of claim 1 which comprises wetting said inorganic fillers with the stabilizing emulsion and then incorporating the drying oil and bodying agent into the resulting mixture.

4. The composition of claim 1 wherein said bodying oil is a vegetable bodied oil.

5. The composition of claim 4 wherein said inorganic fillers are employed in a size ranging from about 100 to 400 mesh.

6. A composition consisting essentially of about 25 to 80 weight percent of a mixture of graphite, bentonitic clay and powdered lead, about 3 to 30 weight percent of raw linseed oil, about 10 to 30 weight percent of bodied soya bean oil and about 5 to 30 weight percent of a stabilizing emulsion consisting essentially of water and a non-drying polymerized polyolefinic glyceride propane extract from bodied herring oil, said emulsion containing about 1 part of the water for each 4 to 20 parts of said glyceride.

7. The method of preparing the composition of claim 4 which comprises wetting the inorganic fillers with said stabilizing emulsion and then incorporating the drying oil and bodied vegetable oil into the resulting mixture.

8. The composition of claim 1 wherein one of the inorganic fillers is graphite.

9. The method of claim 3 wherein one of the inorganic fillers is graphite.

10. The composition of claim 4 wherein one of the inorganic fillers is graphite.

11. The composition of claim 5 wherein one of the inorganic fillers is graphite.

12. The method of claim 7 wherein one of the inorganic fillers is graphite.

References Cited in the file of this patent

UNITED STATES PATENTS

| 492,750 | Richards | Feb. 28, 1893 |
| 494,156 | Newel | Mar. 28, 1893 |
| 2,077,167 | Crowet | Apr. 13, 1937 |

FOREIGN PATENTS

| 369,834 | Great Britain | Mar. 31, 1932 |

OTHER REFERENCES

Haynes: "Chemical Trade Names and Commercial Synonyms," 2nd edition, 1955, page 446.